United States Patent [19]

van Zanten et al.

[11] Patent Number: 5,136,509
[45] Date of Patent: Aug. 4, 1992

[54] BRAKE SLIPPAGE CONTROL

[75] Inventors: Anton van Zanten, Ditzingen; Wolf-Dieter Ruf, Waldstetten; Friedrich Kost, Stuttgart; Gerhard Kreisselmeier, Ahnatal, all of Fed. Rep. of Germany

[73] Assignee: Robert Bosch GmbH, Stuttgart, Fed. Rep. of Germany

[21] Appl. No.: 466,369

[22] PCT Filed: Sep. 16, 1988

[86] PCT No.: PCT/EP88/00840
§ 371 Date: Apr. 16, 1990
§ 102(e) Date: Apr. 16, 1990

[87] PCT Pub. No.: WO89/02382
PCT Pub. Date: Mar. 23, 1989

[30] Foreign Application Priority Data
Sep. 16, 1987 [DE] Fed. Rep. of Germany ....... 3731075

[51] Int. Cl.$^5$ .............................. B60K 31/00
[52] U.S. Cl. ................. 364/426.01; 180/197; 303/95
[58] Field of Search ........ 364/426.01, 426.02, 364/426.03; 180/197; 303/95, 100

[56] References Cited

U.S. PATENT DOCUMENTS

| 3,635,530 | 1/1972 | Packer et al. | 303/20 |
| 3,838,890 | 10/1974 | Wind | 188/181 A |
| 3,857,612 | 12/1974 | Bynum | 303/20 |
| 4,924,395 | 5/1990 | Evans et al. | 364/426.02 |
| 4,947,954 | 8/1990 | Fujita et al. | 180/197 |
| 4,971,164 | 11/1990 | Fujita et al. | 180/197 |
| 4,985,837 | 1/1991 | Togai et al. | 364/426.02 |
| 5,000,280 | 3/1991 | Wazaki et al. | 180/197 |

FOREIGN PATENT DOCUMENTS

| 0140861 | 5/1985 | European Pat. Off. . |
| 0274397 | 7/1988 | European Pat. Off. . |

Primary Examiner—Thomas G. Black
Attorney, Agent, or Firm—Felfe & Lynch

[57] ABSTRACT

A brake slippage control is described where the difference $\Delta\lambda$ between an acceptable brake slippage $\lambda^*$ and the actual brake slippage is determined. The difference $\Delta\lambda$ is supplied to a control amplifier and converted into actuating times for a brake pressure control unit. Magnitude and increase of the reference value required for forming the slippage values $\lambda$ and $\lambda^*$ is from time to time actualized when the control is switched off.

11 Claims, 3 Drawing Sheets

BRAKE SLIPPAGE CONTROL

BACKGROUND OF THE INVENTION

The invention relates to a brake slippage control wherein the deviation of a signal corresponding to the wheel speed from prescribed portion of a reference speed approximated to the vehicle speed is determined and used to change the brake pressure.

In known slippage controls for vehicles, a reference value is recovered from the speeds of one or several vehicle wheels and approximated to the curve of the vehicle speed. One or several percentages of this reference value are formed and compared to the speed signal of the wheel. When the wheel speed signal falls below or exceeds these percentages (e.g. 95% and 80%), which serve as thresholds, control signals are derived and a brake pressure control unit is activated for pressure variation.

SUMMARY OF THE INVENTION

According to the invention, the deviation $\Delta\lambda$, is supplied to a control amplifier which is provided with a proportional-differential conversion property having a resettable integral portion. The output signal $\pm U$ of the control amplifier is used for actuating a brake pressure control unit comprising hydraulic valves. The magnitude and sign of the output signal determine the time during which pressure is built up, reduced, or maintained constant. The control is temporarily interrupted for a short period in which the reference speed and the increase thereof are actualized.

During the controlled braking of a vehicle wheel in regular operation, a brake slippage value is selected which corresponds to the maximum adhesion coefficient of the wheel in longitudinal direction. To improve control over the vehicle, it is possible to apply a selected underbraking to the wheel via an externally triggered operator action. The control generates very small brake pressure amplitudes which is advantageous with regard to comfort and energy consumption. Since the evaluation carried out is slippage-defined, the control has an improved robustness against interferences as compared to those controls operating in dependency upon the wheel acceleration. The clearly arranged design, the small memory capacity which is required and the small number of parameters are of interest with respect to realizing a microcomputer.

DETAILED DESCRIPTION OF THE PREFERRED EMBODIMENT

Figure 1:
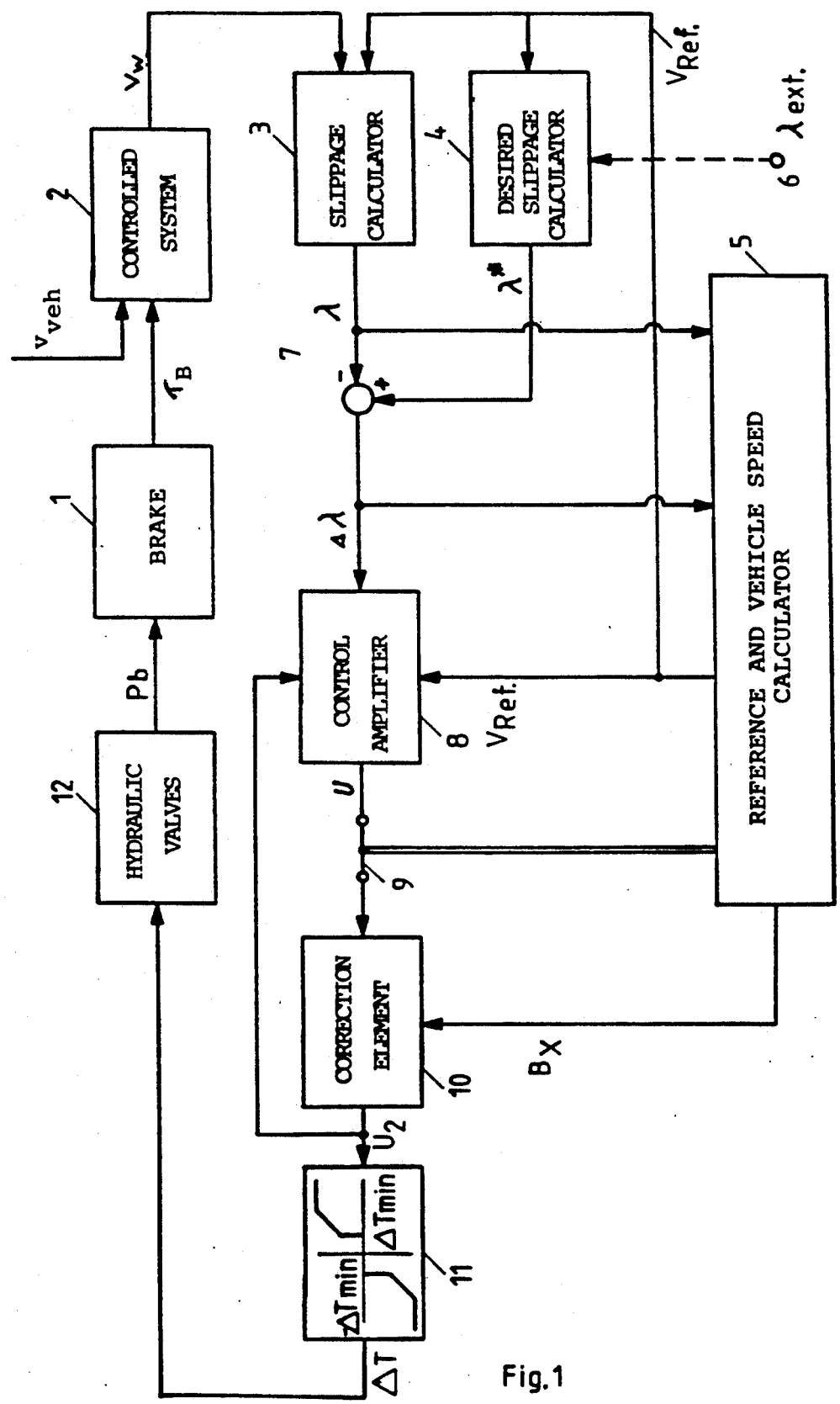
FIG. 1 is a block diagram of a control circuit.

In FIG. 1 a wheel brake 1 affects the controlled system 2 including the systems wheel, tire and road. This controlled system 2 has the input values braking torque $T_B$ and vehicle speed $V_{veh}$ and the output value wheel speed $v_w$. The measured wheel speed signal $v_w$ is supplied to a slippage calculator 3 to which a reference value $v_{Ref}$ from block 5 is also supplied. Further, this reference value $v_{Ref}$ is also supplied to a desired slippage calculator 4 which determines a desired slippage value $\lambda^*$, e.g. 5%. The desired slippage calculator 4 can be actuated via terminal 6 and switched over to another value (e.g. in a curve).

The slippage $\lambda$ which is formed in the slippage calculator 3 according to the relation $$\lambda = 1 - v_w/v_{Ref}$$

is, in a comparator 7, compared to the desired slippage $\lambda^*$ and the deviation $\Delta\lambda$ is supplied to a control amplifier 8. The latter essentially has proportional-differential transmission properties between the control deviation $\Delta\lambda$ and its output value U, a resettable integral portion (i.e., the I-portion is reset for $(U_2(K-1) \geq T_{min})$, a dependency of its amplification upon the reference speed $v_{Ref}$ and logic scans which serve to apply various control rules depending upon the preceding sign of $\Delta\lambda$ and d $\Delta\lambda/dt$.

With the deviation $$\Delta\lambda = \lambda^* - \lambda$$

the following relations apply:

$$\left. \begin{array}{l} U_p = K_p * \Delta\lambda \\ U_d = K_d * d\Delta\lambda/dt \\ U_{p4} = 0 \end{array} \right\} \text{ for } d\Delta\lambda/dt \leq 0$$

$$\left. \begin{array}{l} U_p = 0 \\ U_d = K_d * (d\Delta\lambda/dt - \dot{\Delta\lambda^*}) \\ U_{p4} = -K_{p4} * (\Delta\lambda)^4 \end{array} \right\} \begin{array}{l} \text{for } d\Delta\lambda/dt > 0 \\ \text{and } \Delta\lambda \leq 0 \end{array}$$

$$\left. \begin{array}{l} U_p = K_p * \Delta\lambda \\ U_d = K_d * d\Delta\lambda/dt \\ U_{p4} = 0 \end{array} \right\} \begin{array}{l} \text{for } d\Delta\lambda/dt > 0 \\ \text{and } \Delta\lambda > 0 \end{array}$$

According to $$U = (U_p + U_d + U_{p4} + U_{mem}) * K_{u(vRef)}$$

the control value is composed of the individual portions. Umem is here the I-portion, which can be calculated from $$\begin{array}{lll} U_{mem}(K) & = U_{mem}(K-1) & \text{for } |U_2(K-1)| < T_{min} \\ & = K_i * \Delta\lambda(K-1) & \\ U_{mem}(k) & = 0 & \text{for } |U_2(K-1)| \geq T_{min} \end{array}$$

The letter K is an index for the scanning interval. Further, the I-portion Umem is set to zero when the control is interrupted by a switch 9, for example.

The factor $K_{u(vRef)}$ allows for the vehicle speed dependency of the parameters of the controlled system. Ku is a function of $v_{Ref}$, e.g. $K_u = a_0 + a_1 * v_{Ref}$, for $a_0$, $a_1 = \text{const}$.

Figure 2:
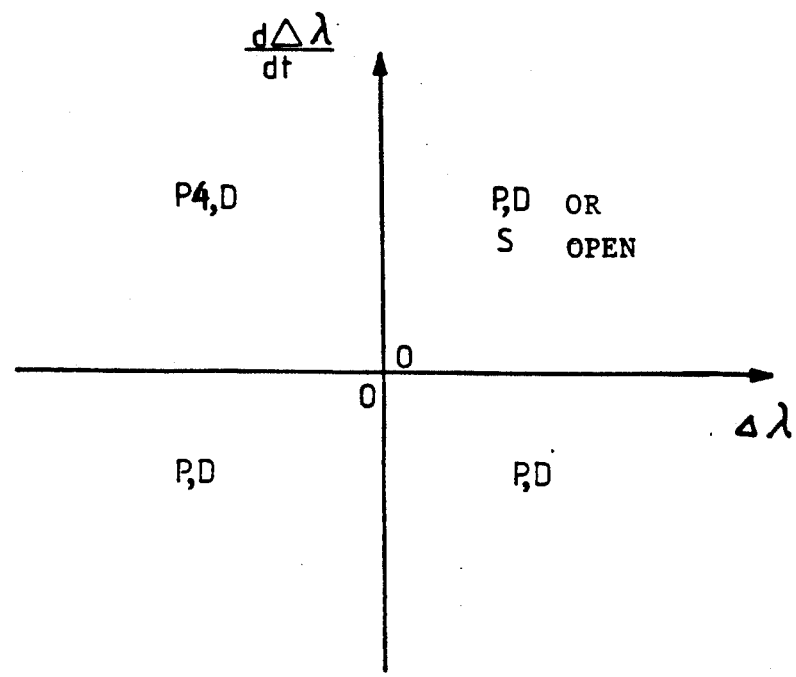
FIG. 2 shows the characteristics of the control amplifier.

FIG. 2 gives the characteristics of the control amplifier for certain values of $\Delta\lambda$ and d $\Delta\lambda/dt$ without integral portion. P means proportional, D differential.

The block 5 extrapolates the reference speed $v_{Ref}$ from scanning point (K−1) to scanning point (K) according to $$v_{ref}(K) = v_{Ref}(K-1) - Bx * Ta$$

where Ta is the time interval between scanning points. Moreover, in suited time intervals (adjusting phases) it can interrupt the slippage control in order to update the estimated vehicle deceleration Bx (gradient of the reference speed) as well as the reference speed itself. The reference speed must correspond to a wheel speed where stable wheel characteristics are observed.

The adjusting phase begins when the all of the following conditions are fulfilled:
1. After the last adjusting phase, the desired slippage $\lambda^*$ has been exceeded at least once,
2. After the last adjusting phase, a time of at least $T_{Amin}$ has passed,
3. for the control deviation $\Delta\lambda > 0$ applies,
4. and $d\cdot\Delta\lambda/dt > 0$.

The adjustment of $v_{Ref}$ and Bx is carried out as follows: If the above conditions are fulfilled, pressure is maintained for a period Tmean, i.e. control is interrupted by opening the switch 9. During this time $\lambda$ is averaged. The averaged slippage is used to update $v_{Ref}$ and Bx:

$$v_{Ref,new} = v_{Ref,old} * (1 - \bar{\lambda})$$

$$Bx_{new} = (T_o Bx_{old} + V_{Ref,new})/(1-\bar{\lambda})(T_A + T_o)$$

In the equations

| | |
|---|---|
| $v_{Ref, new}$ Bx,new | are the actualized values |
| $v_{Ref,old}$ BX,old | ... the values before the actualization. |
| $v_A$ | ... the reference speed after the last adjustment |
| $T_A$ | ... the time elapsed after the last adjustment, |
| To | ... a constant to be prescribed. |

Figure 3:
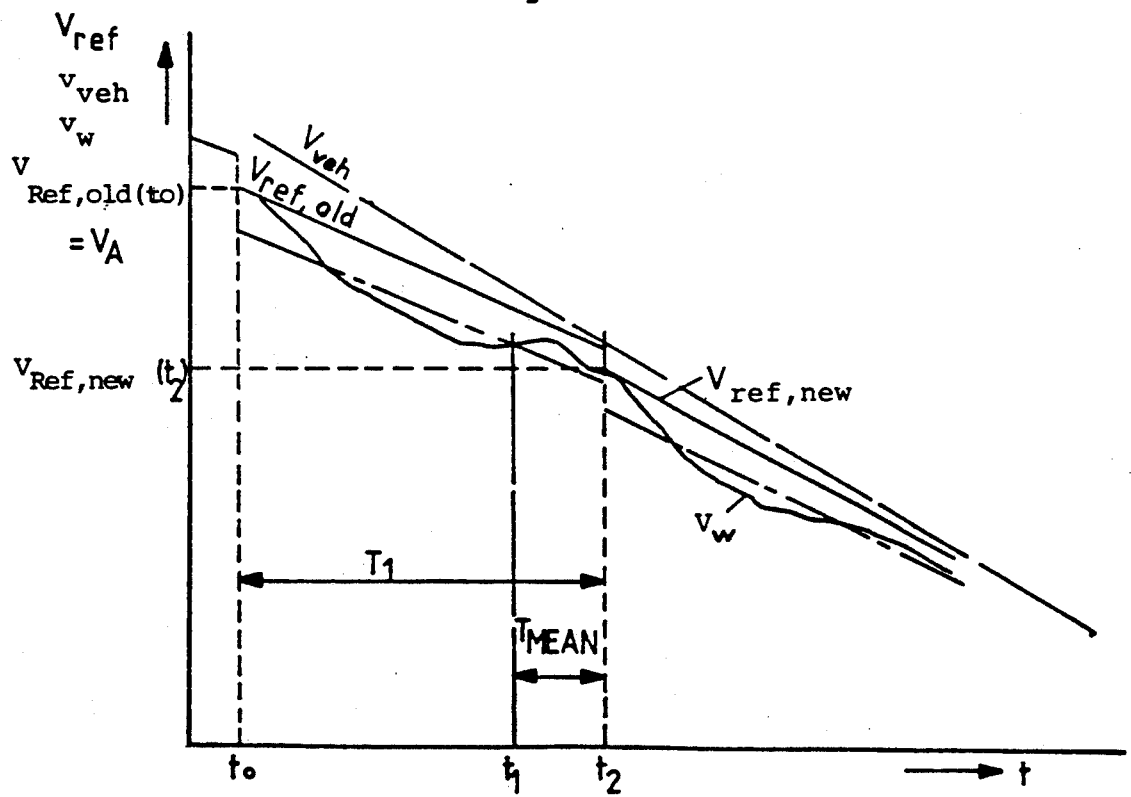
FIG. 3 shows the relationship of the various speeds to time.

FIG. 3 clarifies this procedure. The time interval Tmean is preferably set equal to the duration of the amplitude of the lowest occurring natural frequency in the wheel-tire-road-system (e.g. 80 ms). The adjustment phase is then terminated and switch 9 can be closed again. The adjustment phase can already be terminated before Tmean elapses if an interference causes the control deviation to strongly increase.

If several wheels of a vehicle are controlled in accordance with the invention, the reference speeds contain redundant information on the vehicle movement. It is, hence, suitable when a common vehicle deceleration Bx is determined with all wheels; i.e. each wheel can update the estimated vehicle speed by applying the described adjustment conditions. The reference speeds themselves, however, are formed individually for each wheel. An additional safety feature against unacceptable decreasing of the reference speed can be achieved by calculating a lower limit $$\dot{v}_{Ref,min} = \alpha \cdot v_{Ref,max}$$

based on the maximum speed $v_{Ref,max}$. The reference speeds of the other wheels must not fall below this limit:

$v_{Ref, i}$ remains for $v_{Ref, i} \geq v_{Ref,min}$  $i = 1,2,3,4$
$v_{Ref, i} = v_{Ref,min}$ for $v_{Ref, i} < v_{Ref,min}$ The index indicates the numbering of the wheels, the variable $\alpha$ can assume the value 0.8, for example.

When the switch 9 is closed, the output signal U of the control amplifier 8 is equal to the input signal of a correction element 10. The latter corrects the input signal U so as to become an output signal $U_2$ such that different pressure gradients can be allowed for.

The pressure gradient resulting from opening one of the valves depends upon the pressure difference effective at the valve, hence, also upon the pressure prevailing in the wheel brake cylinder itself. The vehicle deceleration or a substitute value corresponding thereto, e.g. Bx, can be used to estimate this pressure. This variable Bx is used in the correction element 10 in order to convert the control output variable U into $U_2$ such that the following applies for good approximation:

$$\Delta P = b * U, \quad b \approx \text{const.}$$

wherein $\Delta P$ is the wheel brake pressure change resulting from U and b is a proportionality factor approximately constant for most of the operating conditions.

The correction, for example, can be carried out according to the equations $$U_2 = U * (a1 + a2 * Bx^2), \quad U > 0$$
$$U_2 = U * (a2 - (a4 - a5 * Bx) * Bx) \quad U < 0$$

wherein $a_1, a_2, a_3, a_4$ and $a_5$ are constants which can be determined in a driving test.

$U_2$ is hence proportional to U but by means of Bx, it is corrected such that in case of different pressures for the same values for U, approximately the same pressure changes $\Delta P$ result.

The wheel brake pressure P is selected by means of hydraulic valves 12. A 3/3 valve can be used for example.

The valves are operated by prescribing the valve opening time $\Delta T$ while the following conditions apply:

$\Delta T > 0$: The inlet valve is opened for a time $|\Delta T|$ then closed again. The outlet valve remains closed (pressure build-up).

$\Delta T < 0$: The outlet valve is opened for a time $|\Delta T|$ and then closed again. The inlet valve remains closed (pressure reduction).

$\Delta T = 0$: inlet valve and outlet valve remain closed.

A block 11 with a nonlinear characteristic curve forms the opening time $\Delta T$ from the corrected control signal $U_2$ ensuring that the valves cannot be operated when $|U_2|$ is too small. Also, time delays $Tt^+$, $Tt^-$ can be considered in the response of the valves.

Figure 4:
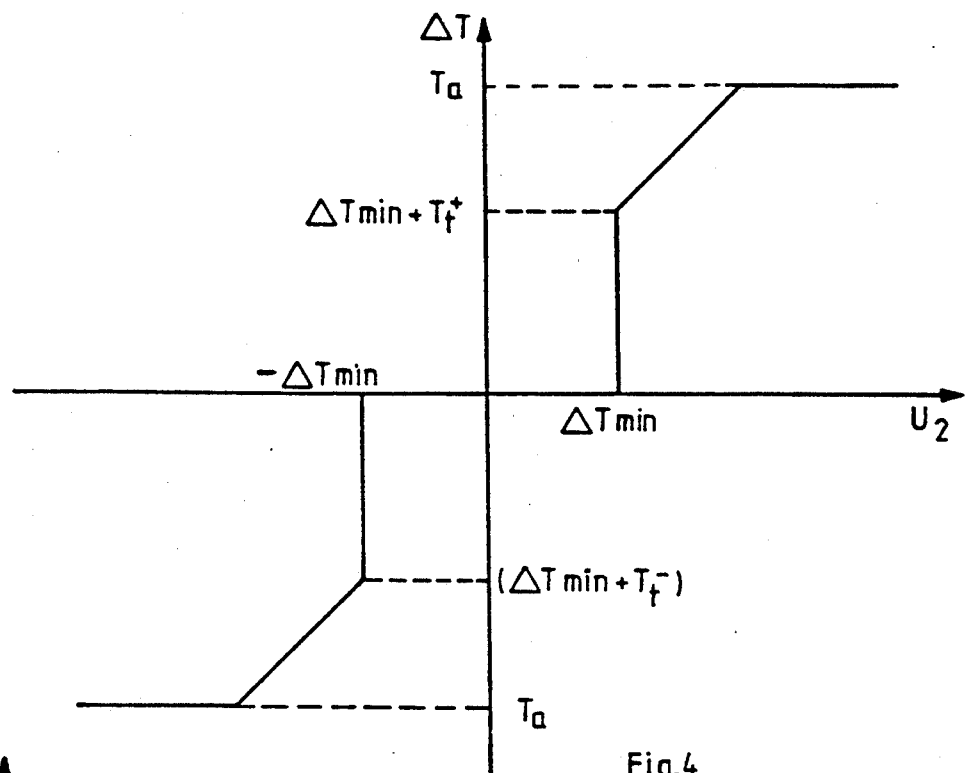
FIG. 4 is a possible characteristic curve of the control output.

FIG. 4 gives a possible characteristic curve.

Figure 5:
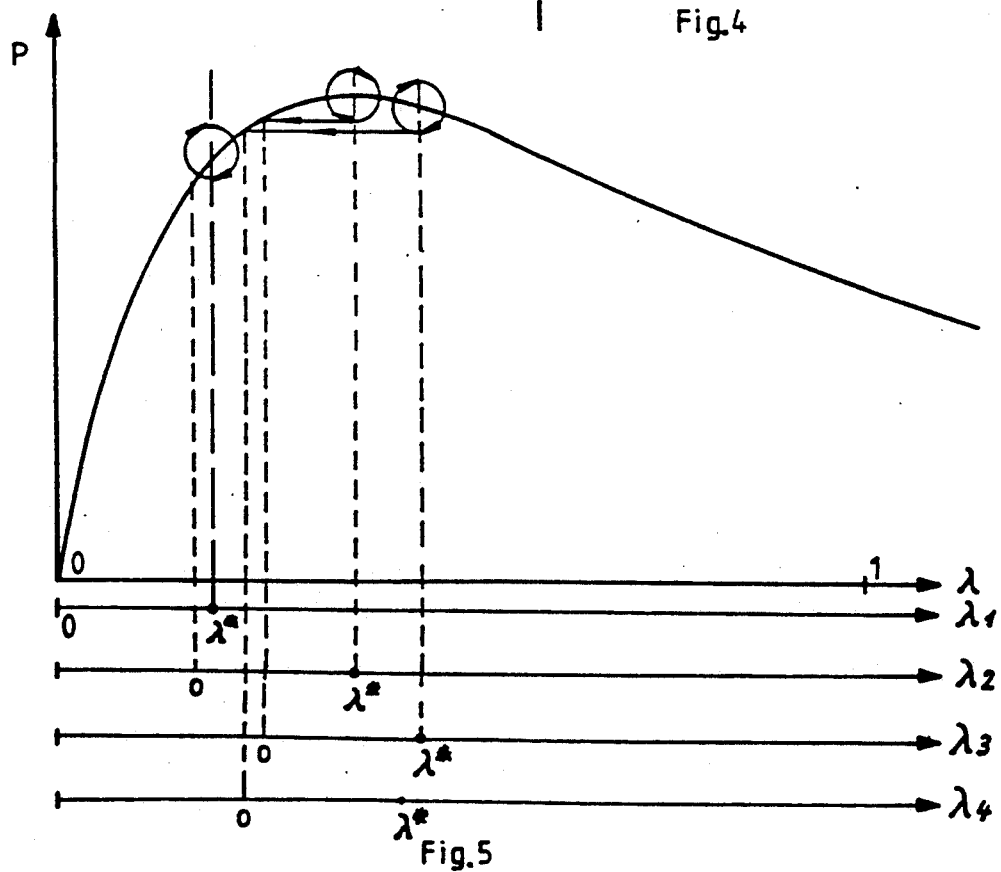
FIG. 5 shows the brake pressure as a function of wheel slippage.

FIG. 5 represents the brake pressure P as function of the determined wheel slippage. This serves to explain the control procedure. At the time $t_1$, a new estimate for $v_{Ref}$ and Bx is available which has been instantaneously recovered (adjustment). Switch 9 is closed and a desired slippage $\lambda^*$ is selected. Since this can never be done with absolute accuracy, there will always be a small control activity. If all four adjustment conditions are met during the control procedure, switch 9 is opened again and the slippage decreases. Based on this adjusting condition, a new reference is formed such that the slippage calculated therefrom turns out to be $\approx 0$. This again is a basis to adjust $\lambda^*$, etc. $\lambda^*$ is assumed to be a constant. (e.g. 5%).

| Variables used: | |
|---|---|
| $V_R$ | wheel speed |
| $V_F$ | vehicle speed |
| $V_{Ref}$ | reference speed |
| $V_{Refl}$ | lower limit for reference speeds |
| $V_{Ref,\,max}$ | maximum reference speeds |
| $V_A$ | reference speed after preceding adjustment |
| Bx | estimated vehicle deceleration |
| $\lambda$ | brake slippage |
| $\lambda^*$ | desired slippage |
| $\bar{\lambda}$ | average slippage |
| $\Delta\lambda^*$ | desired value for slippage change (constant) |
| $\Delta\lambda$ | control deviation in slippage |
| $\lambda_{ext}$ | external operator action |
| Ta | scanning interval period |
| $\Delta T$ | period of valve opening |
| $\Delta T_{min}$ | minimum valve opening time |
| $T_t +/-$ | correction constants |
| $T_A$ | time elapsed since last adjustment |
| $T_{Amin}$ | minimum time between two adjustments |
| $T_{mean}$ | time for determining the average |
| TO | constant to be prescribed |
| U1, U2, U | control signals |
| Up, Ud, Up4, Umem | portions of U |
| Kp, Kd, Kp4, Ki, Ku | amplification factors |
| a1, ..., a5 | constants to be prescribed |
| P | wheel pressure |
| $\Delta P$ | wheel pressure change |
| Mb | braking torque |
| a | proportionality factor |
| b | proportionality factor |
| K | index for interval |
| i | index for wheel |

We claim:

1. Brake slippage control apparatus for a vehicle having wheels and moving at a vehicle speed, comprising
  a brake pressure control unit,
  means for determining the speed $V_w$ of a vehicle wheel,
  means for determining a reference speed $V_{Ref}$ from said wheel speed $V_w$, $V_{Ref}$ being determined for each wheel,
  means for determining the gradient Bx of the reference speed,
  means for determining an actual wheel slippage $\lambda = 1 - V_w/V_{ref}$,
  means for determining a deviation $\Delta\lambda = \lambda^* - \lambda$ between a desired slippage $\lambda^*$ and the actual slippage $\lambda$,
  control amplifier means for converting said signal $\Delta\lambda$ to a control signal U whose magnitude and sign determine pressure build-up time, decay time, and constant holding time for the brake pressure control unit, said control amplifier having means having a proportional differential transfer characteristic with a resettable integral portion,
  means for interrupting the control amplifier when certain conditions are fulfilled, and
  means for updating the reference speed and the gradient Bx according to $V_{Ref}(K) = V_{Ref}(K-1) - BxTa$, wherein $(K-1)$, K, ... are points of time separated by intervals Ta, during periods when the operation of the control amplifier is interrupted.

2. Apparatus as in claim 1, characterized in that with the start of the update a pressure maintenance phase of a certain length $T_{mean}$ is triggered, in that during this phase the slippage $\lambda$ of the vehicle wheel is averaged to obtain an average slippage $\bar{\lambda}$, and in that the new reference value $V_{Ref,new}$ and the new increase thereof Bxnew are determined following this relation:

$$V_{Ref,new} \approx V_{Ref,\,old}(1 - \bar{\lambda})$$

$$Bx_{new} = \frac{T_o Bx_{old} + V_A - V_{Ref,new}}{(1 - \bar{\lambda})(T_A + T_o)}$$

wherein $T_o$ is a constant, $V_A$ is the reference value after the last adjustment, and $T_A$ is the time which has elapsed since the last adjustment.

3. Apparatus as in claim 1, characterized in that the output signal U of the control amplifier is formed following the relation $$U = (Up + Ud + Up4 + Umem)Ku_{(vRef)}$$

wherein Up, Ud and Up4 are calculated from the following relations:

$$\left. \begin{array}{l} Up = Kp * \Delta\lambda \\ Ud = Kd * d\Delta\lambda/dt \\ Up4 = 0 \end{array} \right\} \text{ for } d\Delta\lambda/dt \leq 0$$

$$\left. \begin{array}{l} Up = 0 \\ Ud = Kd * (d\Delta\lambda/dt - \Delta\lambda^*) \\ Up4 = -Kp4 * (\Delta\lambda)^4 \end{array} \right\} \begin{array}{l} \text{for } d\Delta\lambda/dt > 0 \\ \text{and } \Delta\lambda \leq 0 \end{array}$$

$$\left. \begin{array}{l} Up = Kp * \Delta\lambda \\ Ud = Kd * d\Delta\lambda/dt \\ Up4 = 0 \end{array} \right\} \begin{array}{l} \text{for } d\Delta\lambda/dt > 0 \\ \text{and } \Delta\lambda > 0 \end{array}$$

and Umem is an integral portion resulting from the following relation:

$$\begin{array}{ll} Umem(K) = Umem(K-1) & \text{for } |U_2(K-1)| < T_{min} \\ \phantom{Umem(K)} = Ki * \Delta\lambda(K-1) & \\ Umem(K) = 0 & \text{for } |U_2(K-1)| \geq T_{min} \end{array}$$

wherein $T_{min}$ is the minimum actuation time for pressure reduction and pressure increase, K is the index of the scanning interval, Ki is a constant and Ku is a variable expressing the vehicle speed dependency of the parameters of the controlled system.

4. Apparatus in accordance with claim 2, characterized in that the integral portion Umem(k) is set to zero even if the control is interrupted.

5. Apparatus in accordance with claim 2, characterized in that when several wheels are controlled, the greatest reference speed is determined and the other reference speeds are limited to a minimum which is proportional to said greatest reference speed.

6. Apparatus in accordance with claim 5 wherein said minimum can be changed by an externally supplied signal.

7. Apparatus in accordance with claim 2, characterized in that when several wheels are controlled a common gradient Bx is determined for all wheels.

8. Apparatus as in claim 1 wherein said control amplifier is interrupted when a certain time $T_{Amin}$ has elapsed since the last update, the deviation $\Delta\lambda$ has at least once been smaller than zero, the deviation is $\Delta\lambda > 0$, and $d\Delta\lambda/dt > 0$.

9. Apparatus in accordance with claim 1, characterized in that while allowing for the increase of the reference speed, the output signal U of the control amplifier is corrected to become a signal $U_2$ determining the actuating time of the brake control unit.

10. Apparatus in accordance with claim 9 wherein $U_2$ is determined by the following relation:

$$U_2 = U * (a1 + a2 * Bx^2), \qquad U > 0$$
$$U_2 = U * (a2 - (a4 - a5 * Bx) * Bx) \quad U < 0.$$

11. Apparatus in accordance with claim 1, characterized in that signals U and $U_2$ which do not exceed a certain magnitude are not allowed for when determining the length of the actuating signals for the brake pressure control unit.

* * * * *